(No Model.)

A. McDONALD.
ROTARY DISC CUTTER HOLDER.

No. 262,237. Patented Aug. 8, 1882.

Witnesses
S. N. Piper
E. B. Pratt

Inventor.
Alexander McDonald
by R. H. Eddy atty.

UNITED STATES PATENT OFFICE.

ALEXANDER McDONALD, OF CAMBRIDGE, MASS., ASSIGNOR TO THE McDONALD STONE CUTTING MACHINE COMPANY, OF NASHUA, N. H.

ROTARY DISK-CUTTER HOLDER.

SPECIFICATION forming part of Letters Patent No. 262,237, dated August 8, 1882.

Application filed May 29, 1882. (No model.)

*To all whom it may concern:*

Be it known that I, ALEXANDER McDONALD, of Cambridge, of the county of Middlesex, of the State of Massachusetts, have invented a new and useful Improvement in Rotary Disk-Cutter Holders for Machines for Cutting or Dressing Stone; and I do hereby declare the same to be described in the following specification, and represented in the accompanying drawings, of which—

Figure 1:
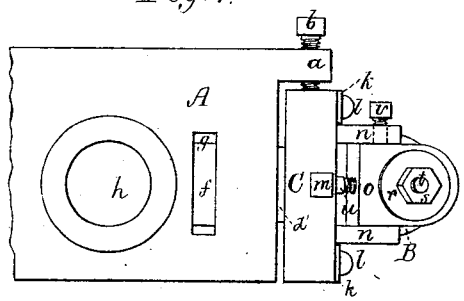
Figure 5:
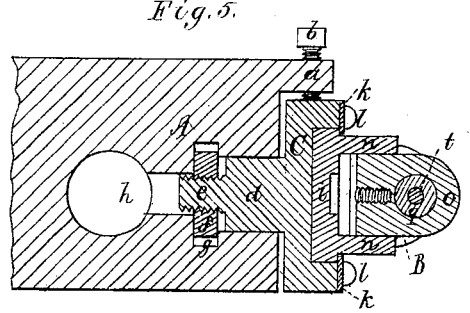
Figure 2:
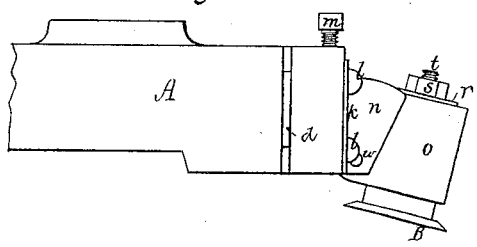
Figure 3:
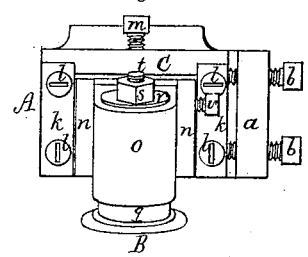
Figure 4:
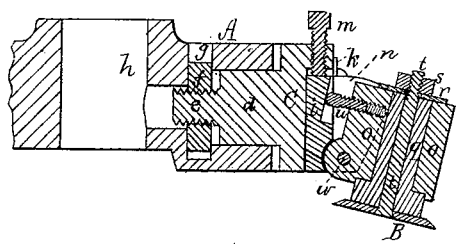

Figure 1 is a top view, Fig. 2 a side elevation, Fig. 3 a front end elevation, Fig. 4 a vertical and longitudinal section, and Fig. 5 a horizontal section, of my new improved mechanism for supporting and adjusting the disk-cutter of a stone-cutting machine.

My present invention relates to another cutting-machine of the class shown and described in Letters Patent No. 222,194, granted to me December 2, 1879, and it is to take the place of the cutter carrying and adjusting mechanism, as described in such patent, the nature of my said present invention being duly set forth in the claim as hereinafter presented.

In the drawings, A denotes one of the arms of the cutter-carrier, and B the disk-cutter, applied to each arm by mechanism to admit of the proper adjustment of the cutter. The arm has a lip, $a$, projecting from it at its outer end and at one side of it. Two screws, $b\,b$, are screwed into and through the lip and against the recessed block C, pivoted to the arm so as to be capable of turning laterally, the pivot $d$ of such block being provided with a screw, $e$, that screws through a nut, $f$, arranged, as shown, within a narrow space or opening, $g$, in the arm. By turning the nut on the screw the block C may be moved a little either toward or away from the shaft-receiving hole $h$ of the arm. The block C is recessed in its front to receive a slide, $i$, which, at its opposite edges, is overlapped by two clamp-plates, $k$, arranged as shown, each of such plates having two screws, $l\,l$, going through it and screwed into the block C. A screw, $m$, arranged in the upper part of the block, serves to depress the slide in its recess. From the slide $i$ two lips, $n\,n$, extend, as shown, there being arranged between and pivoted to them a cutter-support piece, $o$, provided with a disk-cutter, B, whose spindle $q$ is adapted to such support-piece so as to be capable of freely revolving therein, it being held in place by a washer, $r$, and nut $s$, arranged on a rod, $t$, extending from the cutter through the spindle, and having a screw to receive the nut. The washer bears against the upper end of the spindle.

There is a screw, $u$, in the rear part of the support-piece $o$. The head of the said screw rests against the slide. By means of such screw the inclination one way of the cutter-support piece may be adjusted, it being afterward clamped in position by another screw, $v$, which screws through one of the lips of the slide. One of the pivots of the support-piece is shown at $w$.

By the above-described mechanism applied to the arm of the cutter-carrier the disk-cutter can be adjusted or varied in its positions as occasion may require, to cause it to operate to the best advantage.

I do not herein claim disks for cutting or dressing stone; but

What I claim as my invention is as follows:

The combination of the cutter-spindle support-piece $o$, the lipped slide $i$, the pivoted and recessed block C, and the lipped arm A, arranged and adapted and provided with clamps $k$, and adjusting-screws, substantially and to operate as set forth.

ALEXANDER McDONALD.

Witnesses:
R. N. EDDY,
E. B. PRATT.